US011530996B1

(12) United States Patent
Solling et al.

(10) Patent No.: US 11,530,996 B1
(45) Date of Patent: Dec. 20, 2022

(54) CONTROLLING CRYSTALLIZATION AT THE INTERFACE BETWEEN OIL AND BRINE

(71) Applicant: King Fahd University of Petroleum and Minerals, Dhahran (SA)

(72) Inventors: Theis Ivan Solling, Dhahran (SA); Safwat Abdelazeim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/828,434

(22) Filed: Mar. 24, 2020

(51) Int. Cl.
*G01N 23/20* (2018.01)

(52) U.S. Cl.
CPC ................................. *G01N 23/20* (2013.01)

(58) Field of Classification Search
None
See application file for complete search history.

(56) References Cited

U.S. PATENT DOCUMENTS

| | | | |
|---|---|---|---|
| 6,599,449 | B2 | 7/2003 | Morrison et al. |
| 10,429,372 | B2 | 10/2019 | Al-Yousef et al. |
| 2004/0002438 | A1* | 1/2004 | Hawkins .................. H01F 1/44 510/417 |
| 2006/0073333 | A1* | 4/2006 | Anderson ................ A61P 25/00 428/402.2 |
| 2015/0233816 | A1 | 8/2015 | Jakli et al. |
| 2016/0235670 | A1* | 8/2016 | Mason .................... A61K 9/107 |

FOREIGN PATENT DOCUMENTS

CN 101696028 B 2/2012

OTHER PUBLICATIONS

Olesen, et al. ; How a range of metal ions influence the interfacial tension of n-decane/carboxylic acid/water systems: The impact of concentration, molecular- and electronic structure ; Journal of Petroleum Science and Engineering 182 ; Mar. 28, 2019 ; 8 Pages.
Solling, et al. ; Crystalizing the interface—The first X-Ray structure of an oil/surfactant/brine transition layer; Journal of Petroleum Science and Engineering ; Jan. 16, 2020 ; Abstract Only ; 1 Page.
Takeya, et al. ; Predicting the electrokinetic properties of the crude oil/brine interface for enhanced oil recovery in low salinity water flooding ; Fuel, vol. 235 ; pp. 822-831 ; Jan. 1, 2019 ; Abstract Only ; 2 Pages.
Schlossman, et ai. ; Molecular Ordering and Phase Behavior of Surfactants atWater-Oil Interfaces as Probed by X-Ray Surface Scattering ; Annu. Rev. Phys. Chem. 59:153 ; Oct. 24, 2007 ; 25 Pages.

\* cited by examiner

*Primary Examiner* — Hoon K Song
(74) *Attorney, Agent, or Firm* — Oblon, McClelland, Maier & Neustadt, L.L.P.

(57) ABSTRACT

A method is described for determining the structure of a surfactant complex formed at an immiscible liquid-liquid interface. The surfactant complex forms and crystallizes at the interface between an aqueous phase comprising a divalent metal salt and a non-aqueous phase comprising an anionic surfactant. The non-aqueous phase may be in the form of a droplet surrounded by the aqueous phase. The structure of the surfactant complex is determined by X-ray crystallography.

20 Claims, 7 Drawing Sheets

CONTROLLING CRYSTALLIZATION AT THE INTERFACE BETWEEN OIL AND BRINE

STATEMENT REGARDING PRIOR DISCLOSURES BY THE INVENTORS

Aspects of this technology are described in the articles "Crystalizing the interface—The first X-Ray structure of an oil/surfactant/brine transition layer" by Theis I. Soiling, Kristian B. Olesen, Gustav Palm-Henriksen, Safwat Abdel-Azeim, and Anders B. Skov, in *Journal of Petroleum Science and Engineering* 188, 106953 (2020), DOI: 10.1016/j.petrol.2020.106953, and "How a range of metal ions influence the interfacial tension of n-decane/carboxylic acid/water systems: The impact of concentration, molecular- and electronic structure," by Kristian B. Olesen, Lionel T. Fogang, Gustav Palm-Henriksen, Nayef Alyafei, and Theis I. Soiling, in *Journal of Petroleum Science and Engineering* 182, 106307 (2020), DOI: 10.1016/j.petrol.2019.106307, each of which is incorporated herein by reference in its entirety.

STATEMENT OF ACKNOWLEDGEMENT

This project was prepared with financial support from Center for Integrative Petroleum Research, College of Petroleum & Geosciences, King Fand University of Petroleum & Minerals, Dhahran, Saudi Arabia, and the Research and Development (R&D) program (Research Pooling Initiative), Ministry of Education, Riyadh, Saudi Arabia.

BACKGROUND OF THE INVENTION

Technical Field

The present invention relates to a method of determining the structure of a surfactant complex formed at an immiscible liquid-liquid interface.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Seeing is believing; in almost all scientific disciplines that involve chemistry there is a desire to go beyond the physical limits that prevent the observation of real-time and real-space motion of molecules. See A. H. Zewail, *Angew. Chem. Int. ed.* 2000, 39, 2587-2631, incorporated herein by reference in its entirety. In, for example, ultrafast sciences this has almost been accomplished, at least by inference, with the advent of pulsed and very bright X-ray sources operating in the femtosecond time domain, which can, in principle, produce snapshots of chemical reactions while they occur. See R. Neutze, K. Moffat, *Curr. Opin. Stuct. Biol.* 2012, 22, 651-659, incorporated herein by reference in its entirety. However, the experimental conditions are very specific, and in reality it is only gaseous unimolecular decomposition reactions that can be interrogated. Observing dynamic molecular-level structure, or even only molecular structure for that matter, in liquids is a challenge. The challenge becomes even larger when it comes to the structural properties of interfaces, that is, right at the boundary between two immiscible liquids. The chemical bonding environment and associated chemical structure at interfaces are central factors in determining macroscopically observable parameters such as the interfacial tension. Such aspects are also central in a range of cellular processes and determine, for example, the pressure profiles in membranes—these are central to anesthesia and for some of the self-assembling process that are key in membrane signaling and trafficking. See R. Cantor, *Biochemistry,* 1997, 36, 2339-2344; and D. Lingwood, K. Simons, *Science,* 2010, 327, 46-50, each incorporated herein by reference in their entirety.

Interfacial tension can be thought of as molecular unhappiness in the sense that it expresses the energetic expense of expanding the interfacial layer, an expansion that gives rise to an enhancement of the repulsive force between the two layers. See M. P. Andersson, M. V. Bennetzen, A. Klamt, S. L. S. Stipp, *J. Chem. Theor. Comput.* 2014, 10, 3401-3408, incorporated herein by reference in its entirety. So far, no determination of the structure of the interfacial layer with Angstrom scale resolution has been reported. However, several X-ray or neutron scattering studies that determine the nanometer-scale aspects of the interfacial structure have been reported in what is mostly small angle or grazing incidence scattering experiments. These results have shed light on the nature of interfacial repeat units in brine/oil/surfactant systems and, since such interfaces do scatter X-rays, a high degree of orientation is in play. See M. L. Schlossman, A. M. Tikhonov, *Annu. Rev. Phys. Chem.* 2014, 59, 153-177; and E. Scoppol, E. Watkins, G. Li Destri, L. Porcar, R. A. Campbell, O. Konovalov, G. Fragneto, O. Diat, *Phys. Chem. Chem. Phys,* 2015, 17, 15093-15097, each incorporated herein by reference in their entirety. This structure at the interface can be perturbed by even small modifications of the surfactants, resulting in perturbation of the macroscopic observables such as the interfacial tension between the involved two phases.

Another technique that has been employed in addressing interfacial properties is the vibrational sum frequency spectroscopy method (VSFS); this has primarily been employed to shed light on the structure and bonding of molecules at aqueous surfaces via their IR fingerprint. See G. L. Richmond, *Annu. Rev. Phys. Chem.* 2001, 52, 357-389; and F. G. Moore, G. L. Richmond, *Acc. Chem. Res.* 2008, 41, 739-748, each incorporated herein by reference in their entirety. It is then possible to obtain an IR spectrum of the interfacial layer and thereby provide input on the bonding environment exactly at the boundary, but since an IR spectrum has a one-to-one correspondence with structure, the method fully discloses the molecular identity of the interface.

Techniques such as atomic force microscopy (AFM) and transmission electron microscopy (TEM) have also been employed to obtain structural information pertaining to interfaces. In one experiment, an oil-water interface was used as a template for an inorganic growth medium, resulting in a negative material that was shown to be highly structured by TEM. See S. Manne, J. P. Cleveland, H. E. Gaub, G. D. Stucky, P. K. Hansma, Langmuir, 1994, 10, 4409-4413; K. Sakai, K. Okada, T. Misono, T. Endo, M. Abe, *Colloids and Surfaces A: Physicochem. Eng. Aspects,* 2016, 509, 433-439; and S. Schacht, Q. Huo, I. G. Voigt-Martin, F. Schuth, *Science,* 1996, 273, 768-771, each incorporated herein by reference in their entirety. The experiment was additionally taken to indicate that the oil-water interface also has a specific structure. The experimentation involving AFM has led to less conclusive results when applied to the structural properties of the interfaces under study.

Many experimental attempts to obtain the molecular structure of the interfacial layer between liquids have been backed up by a large portfolio of computational methods to arrive at a deeper atomic level understanding of the interactions. Additionally, substantial focus has been put on aqueous interfaces involved in catalytic problems and corrosion where the chemistry relies on interfacial processes. See O. Björneholm, M. H. Hansen, A. Hodgson, L.-M. Liu, D. T. Limmer, A. Michaelides, Philipp Pedevilla, Jan Rossmeisl, H. Shen, G. Tocci, E. Tyrode, M.-M. Walz, J. Werner, H. Bluhm, Chem. Rev. 2016, 116, 7698-7726; and B. Smit, P. A. J. Hilbers, K. Esselink, L. A. M. Rupert, N. M. van Os, A. G. Schlijper, J. Phys. Chem. 1991, 95, 6361-6368; and J. C. Shelley, M. Y. Shelley, Curr. Opin, Coll Interfac. Sci. 2000, 5, 101-110, each incorporated herein by reference in their entirety. Molecular dynamics simulations provide information at the atomic level of the interfacial layer, however, the experimental validation of the computational results is lacking.

In view of the foregoing, one objective of the present invention is to provide a method for determining the molecular structure of a crystal formed at an interface between an aqueous phase and a non-aqueous phase.

BRIEF SUMMARY OF THE INVENTION

According to a first aspect, the present disclosure relates to a method of determining a molecular structure of a surfactant complex formed at an immiscible liquid-liquid interface. The method comprises the steps of forming the interface between an aqueous phase and a non-aqueous phase, where the non-aqueous phase comprises an anionic surfactant. A divalent metal salt is added to the aqueous phase, and a crystalline solid comprising the surfactant complex forms at the interface. The surfactant complex comprises the divalent salt and the anionic surfactant. The molecular structure of the surfactant complex is then determined by X-ray crystallography of the crystalline solid.

In one embodiment, the divalent metal salt is present in the aqueous phase at a concentration in a range of 0.01-1.0 M.

In one embodiment, the divalent metal salt comprises at least one selected from the group consisting of $Zn^{2+}$, $Mg^{2+}$, $Ca^{2+}$, $Sr^{2+}$, $Ba^{2+}$, and $Fe^{2+}$.

In a further embodiment, the divalent metal salt comprises $Zn^{2+}$.

In a further embodiment, the divalent metal salt is at least one selected from the group consisting of $ZnCl_2$, $ZnBr_2$, $ZnI_2$, $ZnF_2$, $ZnO$, $ZnS$, $ZnSO_4$, $ZnSe$, $Zn(OH)_2$, $Zn(NO_3)_2$, and $Zn_3(PO_4)_2$.

In a further embodiment, the divalent metal salt is $ZnCl_2$.

In one embodiment, the anionic surfactant is present in the non-aqueous phase at a concentration in a range of 0.5-3.0 mol % relative to a total number of moles of the non-aqueous phase.

In one embodiment, the anionic surfactant comprises an alkyl carboxylic acid group.

In one embodiment, the anionic surfactant is a cycloalkylalkyl carboxylic acid.

In one embodiment, the anionic surfactant is a cyclohexane alkyl carboxylic acid.

In one embodiment, the anionic surfactant is 3-cyclohexanepropionic acid, 4-cyclohexanebutanoic acid, 5-cyclohexanepentanoic acid, or 6-cyclohexanehexanoic acid.

In one embodiment, the aqueous phase is a brine.

In one embodiment, the non-aqueous phase is in the form of a droplet surrounded by the aqueous phase.

In one embodiment, the molecular structure of the surfactant complex is determined by X-ray crystallography of the crystalline solid while the crystalline solid is located at the immiscible liquid-liquid interface.

In one embodiment, the non-aqueous phase is a hydrocarbon or a mixture of hydrocarbons.

In one embodiment, the hydrocarbon or mixture of hydrocarbons comprises one or more linear alkanes.

In one embodiment, the hydrocarbon or mixture of hydrocarbons comprises octane, nonane, decane, undecane, dodecane, tridecane, tetradecane, or pentadecane.

In one embodiment, the non-aqueous phase consists of the anionic surfactant and decane.

In one embodiment, the crystalline solid is allowed to form for at least 20 minutes.

In one embodiment, the non-aqueous phase comprises petroleum or crude oil.

In one embodiment, the molecular structure is determined with a maximum resolution of 1.00 Å or less.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
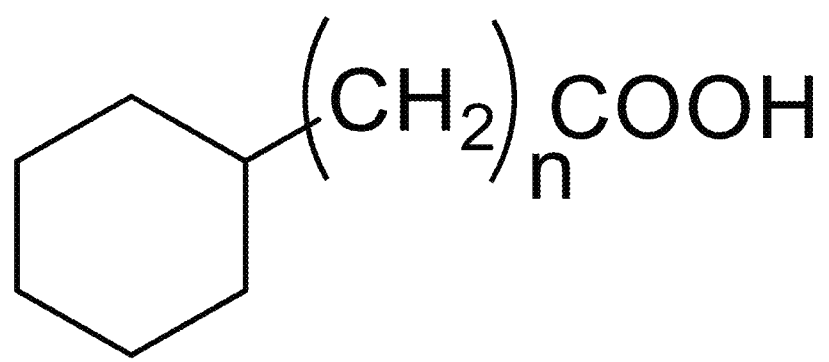
FIG. 1 shows a surfactant structure where n ranges from 0 to 4.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Zn(NO_3)_2$ includes anhydrous $Zn(NO_3)_2$, $Zn(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of zinc include $^{66}Zn$, $^{67}Zn$, $^{68}Zn$, and $^{70}Zn$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of determining a molecular structure of a surfactant complex formed at an immiscible liquid-liquid interface. The method comprises the steps of forming the interface between an aqueous phase and a non-aqueous phase, where the non-aqueous phase comprises an anionic surfactant. A divalent metal salt is added to the aqueous phase, and a crystalline solid comprising the surfactant complex forms at the interface. The surfactant complex comprises the divalent salt and the anionic surfactant. The molecular structure of the surfactant complex is then determined by X-ray crystallography of the crystalline solid.

In one embodiment, the non-aqueous phase is a hydrocarbon or a mixture of hydrocarbons. In one embodiment, the non-aqueous phase comprises crude oil, petroleum, or whole crude oil. In one embodiment, the non-aqueous phase comprises one or more hydrocarbons present in crude oil, petroleum, or whole crude oil.

As used herein, the term "whole crude oil" as used herein means crude oil as it issues from a wellhead except for any treatment such crude oil may receive to render it acceptable for conventional distillation in a refinery, such as dewatering, desalting, and/or sweetening, not having undergone any distillation or fractionation. "Whole crude oil" is crude oil suitable for distillation or other fractionation in a refinery, and may comprise non-boiling entities such as asphaltenes or tar. Such "whole crude oil" may be crude oil(s) straight from an oil field pipeline and/or conventional crude oil storage facility, without any prior fractionation thereof.

While whole crude oil is exemplified, distilled and/or fractionated components or component mixtures may be used, such as those comprising gaseous fuel, pet ether/gasoline, naphtha, kerosene and jet fuel, diesel and fuel oil, atmospheric oil, motor oil, light and heavy vacuum oil, ship fuel, grease, wax, tar/bitumen, or mixtures of 2, 3, 4, 5 or more of any of these, including high boiling residues. In one embodiment, the non-aqueous phase may comprise distilled and/or fractionated components or component mixtures of crude oil.

In one embodiment, the non-aqueous phase is a hydrocarbon or a mixture of hydrocarbons that comprises one or more linear alkanes. Preferably the linear alkane is saturated and unsubstituted. In one embodiment, linear alkane is octane, nonane, decane, undecane, dodecane, tridecane, tetradecane, or pentadecane. In a preferred embodiment, the linear alkane is decane. In an alternative embodiment, the non-aqueous phase is a hydrocarbon or a mixture of hydrocarbons comprising branched alkanes.

As mentioned previously, the non-aqueous phase comprises a surfactant. As used herein, the term "surfactant" refers to a compound capable of reducing the interfacial tension between two media, such as two liquids or a liquid and a solid. In some embodiments, detergents, soaps, wetting agents, and oil dispersants may be considered surfactants. A surfactant in accordance with the present disclosure may refer to a cationic, anionic, zwitterionic or nonionic compound capable of behaving as a surfactant. In preferred embodiments, the surfactant is an anionic surfactant.

Examples of anionic surfactants include, but are not limited to: carboxylates such as alkylcarboxylates, cycloalkycarboxylates, cycloalkylalkylcarboxylates, polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters, sodium alkylarylsulfonate, alpha-olefinsulfonate; sulfates such as sulfated alcohols, sulfated alcohol ethoxylates, fatty alcohol sulfates, sulfated alkylphenols, alkylsulfates, sulfosuccinates, and alkylether sulfates. Anionic surfactants also include, for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (SLS, and also known as sodium lauryl ether sulfate (SLES)), alkyl benzene sulfonate, and soaps.

In one embodiment, the anionic surfactant comprises an alkyl carboxylic acid group. "Alkyl" refers to a fully saturated branched or unbranched carbon chain radical having the number of carbon atoms specified, or up to 30 carbon atoms if no specification is made. For example, alkyl of 1 to 8 carbon atoms refers to radicals such as methyl, ethyl, propyl, butyl, pentyl, hexyl, heptyl, and octyl, and those radicals which are positional isomers of these radicals. Alkyl of 10 to 30 carbon atoms includes decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl.

Moreover, the term "alkyl" as used herein is intended to include both "unsubstituted alkyls" and "substituted alkyls", the latter of which refers to alkyl moieties having substituents replacing a hydrogen on one or more carbons of the hydrocarbon backbone. Such substituents can include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, a cyano, a nitro, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF$_3$, —CN, and the like.

In one embodiment, the anionic surfactant comprises an alkyl carboxylic acid group where the alkyl group is fully saturated (and thus linear). Here, the alkyl group may comprise 2-10 carbons, preferably 3-9 carbons, more preferably 3-8 carbons, more preferably 3-7 carbons, or 3-6 carbons. In one embodiment, the alkyl group comprises more than 2 carbons, or more than 3 carbons.

In one embodiment, the anionic surfactant comprises a cycloalkyl group. Preferred cycloalkyls have from 3-10 carbon atoms in their ring structure, and more preferably have 5, 6, or 7 carbons in the ring structure. Cycloalkyls may be further substituted with alkyls, alkenyls, alkoxyls, alkylthios, aminoalkyls, carbonyl-substituted alkyls, —CF$_3$, —CN, and the like. In a preferred embodiment, the cycloalkyl is unsubstituted. In another preferred embodiment, the cycloalkyl is cyclohexane.

In one embodiment, the anionic surfactant is a cycloalkyl alkyl carboxylic acid. In one embodiment, the anionic surfactant is a cycloalkyl alkyl carboxylic acid where the cycloalkyl and the alkyl are unsubstituted. In a further embodiment, the anionic surfactant is a cyclohexane alkyl carboxylic acid. In a further embodiment, the anionic surfactant is 3-cyclohexanepropionic acid, 4-cyclohexanebutanoic acid, 5-cyclohexanepentanoic acid, or 6-cyclohexanehexanoic acid. In one embodiment, the anionic surfactant is present naturally in crude oil.

In one embodiment, the anionic surfactant is present in the non-aqueous phase at a concentration in a range of 0.5-3.0 mol %, preferably 0.7-2.5 mol %, more preferably 0.8-2.0 mol %, even more preferably 1.0-1.8 mol %, 1.3-1.7 mol %, or about 1.6 mol %, relative to a total number of moles of the non-aqueous phase.

In one embodiment, the non-aqueous phase consists of the anionic surfactant and one or more hydrocarbons. In one embodiment, the non-aqueous phase consists of a cyclohexane alkyl carboxylic acid and one or more hydrocarbons.

In one embodiment, the non-aqueous phase consists of the anionic surfactant and decane. In one embodiment, the non-aqueous phase consists of a cyclohexane alkyl carboxylic acid and decane.

In one embodiment, the aqueous phase may comprise water which may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 µS·cm$^{-1}$, preferably less than 1 µS·cm$^{-1}$, a resistivity greater than 0.1 MΩ·cm, preferably greater than 1 MΩ·cm, more preferably greater than 10 Ma cm, a total solid concentration less than 5 mg/kg, preferably less than 1 mg/kg, and a total organic carbon concentration less than 1000 µg/L, preferably less than 200 µg/L, more preferably less than 50 µg/L.

In one embodiment, the aqueous phase may comprise a brine. The brine may have a wide salinity range of 500-200,000 ppm, preferably 1,000-100,000 ppm, more preferably 2,500-75,000 ppm. Minerals contained in the brine solution include but are not limited to chloride, sodium, sulfate, magnesium, calcium, potassium, bicarbonate, carbonate, bromide, boron, strontium, and fluoride. In another embodiment, "brine" may be used more generally to refer to an aqueous solution of a salt, and includes sea water.

In one embodiment, the divalent metal salt is present in the aqueous phase at a concentration in a range of 0.01-1.0 M, preferably 0.05-0.8 M, preferably 0.1-0.7 M, more preferably 0.2-0.6 M, 0.3-0.6 M, or about 0.5 M.

In one embodiment, the divalent metal salt comprises at least one selected from the group consisting of $Zn^{2+}$, $Mg^{2+}$, $Ca^{2+}$, $Sr^{2+}$, $Ba^{2+}$, $Fe^{2+}$, $Be^{2+}$, $Hg^{2+}$, $Cr^{2+}$, $Co^{2+}$, $Cu^{2+}$, $Pt^{2+}$, $Mn^{2+}$, $Ni^{2+}$, $Sn^{2+}$, $Cd^{2+}$, $Sr^{2+}$, $Va^{2+}$, $Ge^{2+}$, or $Pb^{2+}$. In a further embodiment, the divalent metal salt comprises at least one selected from the group consisting of $Zn^{2+}$, $Mg^{2+}$, $Ca^{2+}$, $Sr^{2+}$, $Ba^{2+}$, and $Fe^{2+}$. In a further embodiment, the divalent metal salt comprises $Zn^{2+}$.

In one embodiment, the divalent metal salt may comprise an anion selected from the group consisting of $Cl^-$, $Br^-$, $I^-$, $F^-$, $O^{2-}$, $S^{2-}$, $SO_4^{2-}$, $Se^{2-}$, $OH^-$, $NO_3^-$, and $PO_4^{3-}$. In a further embodiment, the divalent metal salt may comprise an anion selected from the group consisting of $Cl^-$, Br, $I^-$, and $F^-$.

In one embodiment, the divalent metal salt is at least one selected from the group consisting of $ZnCl_2$, $ZnBr_2$, $ZnI_2$, $ZnF_2$, $ZnO$, $ZnS$, $ZnSO_4$, $ZnSe$, $Zn(OH)_2$, $Zn(NO_3)_2$, and $Zn_3(PO_4)_2$. In a preferred embodiment, the divalent metal salt is $ZnCl_2$.

In alternative embodiments, the aqueous phase and/or the non-aqueous phase may comprise other agents, including but not limited to deflocculants such as lignite, tannin, polycarbonate, polycarboxylate, polyacrylamide, sodium carboxymethyl cellulose, sodium citrate, sodium silicate, ammonium oxalate, sodium oxalate, gum arabic, humic acid resin and bentonite; proppants such as sand, clay, bauxite, alumina and aluminosilicates; dispersants such as lignosulfate, polymethacrylate, hydroxypropyl methacrylate polyacrylamide, sodium vinyl sulfonate, sodium acrylamidomethylpropane sulfonate, phosphonobutane tricarboxylic acid, amino trimethylene phosphonic acid, hydroxyethylidene diphosphonic acid, sodium hydroxyethylidene diphosphonate, and diethylenetriamine pentamethylene phosphonic acid; and combinations thereof.

As mentioned previously, the method of the present disclosure involves determining the molecular structure of a surfactant complex formed at an immiscible liquid-liquid interface between an aqueous phase and a non-aqueous phase. Here, the interface is where the two liquids are in direct contact with each other, and the immiscible nature of the interface means that the aqueous phase is not significantly soluble in the non-aqueous phase, and vice versa. In one embodiment, the aqueous phase may have a very low solubility in the non-aqueous phase, for instance, the aqueous phase may be soluble in the non-aqueous phase in an amount of less than 50 ppm, preferably less than 30 ppm, and more preferably less than about 10 ppm. Similarly, the non-aqueous phase may have a very low solubility in the aqueous phase, for instance, the non-aqueous phase may be soluble in the aqueous phase in an amount of less than 50 ppm, preferably less than 30 ppm, and more preferably less than about 10 ppm.

Figure 2:
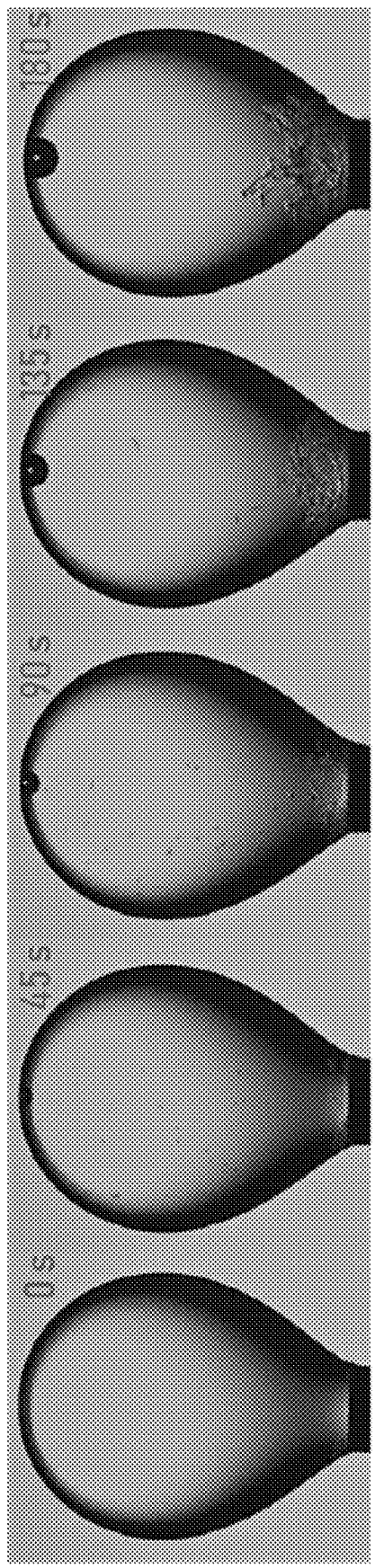
FIG. 2 shows the crystallization of the decane/acid-brine interface, where the acid has n=2 and the concentration of $Zn^{2+}$ is 0.5 M.

In one embodiment, the non-aqueous phase is partially or completely surrounded by the aqueous phase. In a further embodiment, the non-aqueous phase is in the form of a sphere or droplet, as shown in FIG. 2, which also means that the interface is in a substantially similar shape at the surface. Where the non-aqueous phase is partially or completely surrounded by the aqueous phase, the non-aqueous phase may have a volume in a range of 10 µL-2 mL, preferably 50 µL-1 mL, more preferably 100 µL-800 µL, even more preferably 150 µL-700 µL. In alternative embodiments, the aqueous phase is partially or completely surrounded by the non-aqueous phase, and with similar volumes as discussed above. In another embodiment, neither phase may surround the other, and the interface between the phases may be substantially planar. In one embodiment, the immiscible liquid-liquid interface may have a surface area in a range of 0.1 mm$^2$-10 cm$^2$, preferably 1 mm$^2$-5 cm$^2$, more preferably 10 mm$^2$-2 cm$^2$, even more preferably 50 mm$^2$-1.5 cm$^2$, or 75 mm$^2$-1.0 cm$^2$.

The step of forming the interface between the aqueous phase and the non-aqueous phase may involve directly contacting the two phases by any number of means. For instance, one phase may be poured into another phase. To form a droplet, one phase may be injected into another phase. With the two phases being immiscible, in some embodiments, such as when using a separation funnel, the two phases may be contacted, mixed, and then allowed to separate.

The method involves adding the divalent metal salt to the aqueous phase, however, in some embodiments, the aqueous phase may already comprise the divalent metal salt before being contacted with the non-aqueous phase in the formation of the immiscible liquid-liquid interface. Preferably the divalent metal salt dissolves on its own when added to the aqueous phase, however, in some embodiments, the aqueous phase may be stirred or agitated immediately after the divalent metal salt is added. In some embodiments, the addition of the divalent metal salt to the aqueous phase may be considered as forming a second salt solution.

Similarly, in alternative embodiments, the non-aqueous phase without the anionic surfactant may be contacted with the aqueous phase before the anionic surfactant is added to the non-aqueous phase.

Following the addition of the divalent metal salt to the aqueous phase, a crystalline solid comprising the surfactant complex forms at the immiscible liquid-liquid interface. Or, in other words, the surfactant complex forms, and then crystallizes into a crystalline solid of the surfactant complex. Preferably the crystalline solid is in contact with both aqueous phase and non-aqueous phase. In one embodiment, the crystalline solid has a length or longest dimension in a range of 0.1 µm-5 mm, preferably 1 µm-1 mm, more preferably 5 µm-750 µm, even more preferably 10 µm-200 µm. In one embodiment, the crystalline solid may be allowed to form for at least 20 minutes, at least 30 minutes, at least 40 minutes, at least 60 minutes, at least 1.5 h, at least 12 h, at least 24 h. In one embodiment, the crystalline solid may be allowed to form for no more than 36 h, no more than 24 h, no more than 12 h, no more than 1.5 h, no more than 1 h, no more than 40 minutes, no more than 30 minutes, or no more than 20 minutes. In one embodiment, a length or longest dimension of the crystalline solid may grow at a rate in a range of 1 nm/min-500 µm/min, preferably 100 nm/min-100 µm/min, more preferably 500 nm/min-100 µm/min.

In one embodiment, the crystalline solid may be a single ordered crystal, while in other embodiments, the crystalline solid may be two or more crystals. For instance, the crystalline solid may be polycrystalline. "Polycrystalline," as used herein, refers to material composed of multiple crystal grains that are typically separated by high-angle grain boundaries, i.e., boundaries between adjacent grains crystallographically misoriented by greater than 10°, preferably greater than 12°, more preferably greater than 15°. In one embodiment, the crystalline solid, being polycrystalline, may be substantially, or even completely, free of any biaxial texture (e.g., a preferred grain-to-grain orientation).

As mentioned previously, the surfactant complex comprises the divalent metal salt and the anionic surfactant. In one embodiment, a molar ratio of the anionic surfactant to the divalent metal salt may be in a range of 1.0-4.0, preferably 1.5-3.0, more preferably 1.8-2.5, or 1.9-2.1, or about 2.0. In one embodiment, the anionic surfactant is a bidentate ligand to the metal ion of the divalent metal salt. In one embodiment, the surfactant complex consists of the divalent metal salt, the anionic surfactant, and water molecules. In one embodiment, a molar ratio of water to the divalent metal salt may be in a range of 1.0-4.0, preferably 1.5-3.0, more preferably 1.8-2.5, or 1.9-2.1, or about 2.0.

In one embodiment, the crystalline solid consists essentially of the surfactant complex, meaning that at least 99.0 wt %, preferably at least 99.5 wt %, more preferably at least 99.9 wt %, or 100 wt % of the crystalline solid, relative to a total weight of the crystalline solid, is the surfactant complex. In a further embodiment, the crystalline solid consists essentially of a specific surfactant complex, meaning that at least 99.0 wt %, preferably at least 99.5 wt %, more preferably at least 99.9 wt %, or 100 wt % of the crystalline solid, relative to a total weight of the crystalline solid, is a surfactant complex having a 2:2:1 molar ratio of anionic surfactant:water:divalent metal salt.

In one embodiment, the crystalline solid may comprise 0.1-10 wt %, preferably 0.5-5 wt %, more preferably 1.0-4.0 wt % of the non-aqueous phase and/or aqueous phase (e.g. water and/or decane), relative to a total weight of the crystalline solid.

In one embodiment, the crystalline solid is removed from the liquid-liquid interface, for instance, by filtering, decanting, rinsing, drying, or centrifugation. In another embodiment, the crystalline solid may be removed by forceps or aspiration. The crystalline solid may then be washed and optionally dried. The molecular structure of the surfactant complex may be obtained by subjecting the crystalline solid to X-ray crystallography. In one embodiment, the molecular structure may be determined with a maximum resolution of 2.00 Å or less, 1.00 Å or less, 0.80 Å or less, 0.70 Å or less, 0.60 Å or less. In another embodiment, the molecular structure of the surfactant complex may be determined by NMR spectroscopy, with or without selective isotopes being incorporated into the surfactant complex.

In one embodiment, the crystalline solid is not removed from the liquid-liquid interface for X-ray crystallography, and instead the X-ray crystallography (and thus the molecular structure determination of the surfactant complex) is carried out while the crystalline solid is located at the immiscible liquid-liquid interface.

X-ray crystallography is a form of elastic scattering; the outgoing X-rays have the same energy, and thus same wavelength, as the incoming X-rays, only with altered direction. By contrast, inelastic scattering occurs when energy is transferred from the incoming X-ray to the crystal, e.g., by exciting an inner-shell electron to a higher energy level. Such inelastic scattering reduces the energy (or increases the wavelength) of the outgoing beam. Inelastic scattering is useful for probing such excitations of matter, but not in determining the distribution of scatterers within the matter, which is the goal of X-ray crystallography.

X-rays range in wavelength from 0.01 to 10 nanometers; a typical wavelength used for crystallography is 1 Å (0.1 nm), which is on the scale of covalent chemical bonds and the radius of a single atom. Longer-wavelength photons (such as ultraviolet radiation) do not have sufficient resolution to determine the atomic positions. At the other extreme, shorter-wavelength photons such as gamma rays are difficult to produce in large numbers, difficult to focus, and interact too strongly with matter, producing particle-antiparticle pairs. Therefore, X-rays are the "sweet spot" for wavelength when determining atomic-resolution structures from the scattering of electromagnetic radiation. The X-ray source may be an X-ray tube, a rotating anode, a synchrotron, or a free-electron laser.

The examples below are intended to further illustrate protocols for preparing and characterizing the crystalline surfactant complex formed at the interface, and are not intended to limit the scope of the claims.

Example 1

Motivation

The approach here is to use the potential ordering at a brine/oil-surfactant interface that was employed by Schacht et al. in forming templates to obtain atomic level information of the oil/brine interfacial structure. See S. Schacht, Q. Huo, I. G. Voigt-Martin, F. Schuth, *Science*, 1996, 273, 768-771. The specific structure of a range of aqueous divalent metal ions ($M^{2+}$) has been investigated in a recent computational study where the variation of the acidities of $[M(H_2O)_n]^{2+}$ were addressed and related to structure. See V. E. Jackson, A. R. Felmy, D. A. Dixon, *J. Phys. Chem. A* 2015, 119, 2926-2936, incorporated herein by reference in its entirety. The idea is that when there is a good match between the electronic structure of the incoming cation and the surface active components residing at the oil surface, there will be a strong aggregation and potential for crystal formation at the interface. This strategy has been employed by others to amplify X-ray scattering from a brine/oil-surfactant interface where the surfactant had a phosphorus head group. Here, the adhesion of the electrolyte onto the oil surface is pH-dependent because of the solvation structure around the acidic $[Sr(H_2O)_n]^{2+}$ ion, and because of the basic phosphonate group. See W. Bu, M. Mihaylov, D. Amoanu, B. Lin, M. Meron, I. Kuzmenko, L. Soderholm, M. L. Schlossman, *J. Phys. Chem. B* 2014, 118, 12486-12500, incorporated herein by reference in its entirety. In the case of $Sr^{2+}$, the experiment provides direct information about the lamellar structure at the interface, but not a real atomic-scale structure of neither the surfactants nor of their orientation. If the interface had solidified into a crystal form, such a crystal could be isolated and analyzed in, for example, a single-crystal diffraction experiment.

Presently, in an attempt to achieve such an interfacial crystallization for atomic-scale structure, $Zn^{2+}$ ions are added in the form of $ZnCl_2$. This has been shown to provide the most acidic aqua complex aside from toxic $Hg^{2+}$ and $Be^{2+}$ ions. See Jackson et al. (2015). The acidity is to a large extent determined by the interaction between the lone-pairs of the oxygen in water and the center metal ion: The more acidic the metal ion, the larger the interaction. Thus, the aggregation of the metal ion onto the surfactant-containing oil surface will be particularly pronounced for Zn. Here the crystallization is most likely to be favorable because the lattice energy of the interfacial Zn-surfactant crystal counter-balances the solvation energies. This approach is used for the following experiment.

Example 2

Experiments

Here, the interfacial behavior studied in a series of measurements where the interfacial tension (IFT) between a decane/surfactant phase and an aqueous phase was measured in a pendant droplet experiment. The pendant droplet experiment involves the submersion of a decane droplet containing surfactants into an aqueous solution. The analysis of the drop shape provides a value for the interfacial tension between the two phases to provide a measure of the interactions that take place at the interface.

An aliphatic carboxylic acid was chosen as a surfactant to mimic the natural surfactants in most crude oils. It is of utmost importance for efficient oil production to understand the underlying mechanisms that influence interfacial tension. This is because the interfacial tension is a major factor in determining the flow that is necessary to extract oil from the ground. In order to span a range of interfacial properties, the nature of the acid is systematically varied by sequentially adding $CH_2$ groups as shown in FIG. 1. All compounds were employed in 1.66 molar % concentrations relative to decane.

Example 3

Results and Discussion

IFT and Electrolytes

The interfacial tension between the decane/acid phase and pure water varies in a remarkable way. It decreases from 30.3 mN/m in the case of n=0 to reach 27.6 mN/m for n=2, then it goes back up again for n=3, 4. This is taken to indicate a structurally-induced turnover at n=2. The behavior is similar when it comes to the involvement of dilute brines (up to 0.1 M) composed of, for example, LiCl, NaCl, and KCl. However, for higher concentrations (up to 1.0 M) there is a steady decrease reaching the lowest value for 1.0 M KCl in the case of the acid where n=4. The change in trend as a function of salinity is taken to indicate the presence of at least two effects impacting the interfaces each in different directions.

Crystallization at the Interface $Zn^{2+}$ ion was used to shed light on how the surfactant structure influences the structure at the interface. Already at intermediate concentrations, the distinctive nature of $Zn^{2+}$ reveals itself by giving rise to a very low IFT, which indicates a significant interaction between the electrolyte and the liquid-liquid boundary.

Extending the measurement times in the pendent drop experiments beyond 90 seconds resulted in observing crystallization of the interface in real time. Here, the camera used to observe the drop shape of the decane droplet submerged in the brine is also able to record a movie of the crystal growth. FIG. 2 depicts a series of still images from the movie.

It is only when the linker between the ring and the acid group of the surfactant attains a certain length that the crystallization takes place. It is found that the crystals form for n=2-4, whereas n=0 and 1 do not result in crystallization even after extended exposure times. The change in behavior for the acid with two methylene groups (n=2) when it comes to the crystalizing behavior resonates well with the observation that the measured IFT for the decane/acid-pure water systems also shows a turn-over point at n=2. The results point towards a drastically impacted interfacial structure with an onset at n=2 that either reveals itself in the measurement of the surface stress (IFT) or by providing a structure that is favorable for $Zn^{2+}$ adhesion and subsequent crystallization.

In order to determine what impacts the surfactant alignment to enable crystallization it is necessary to deduce the structure at the interface as described herein.

Structural Determination

Figure 3A:
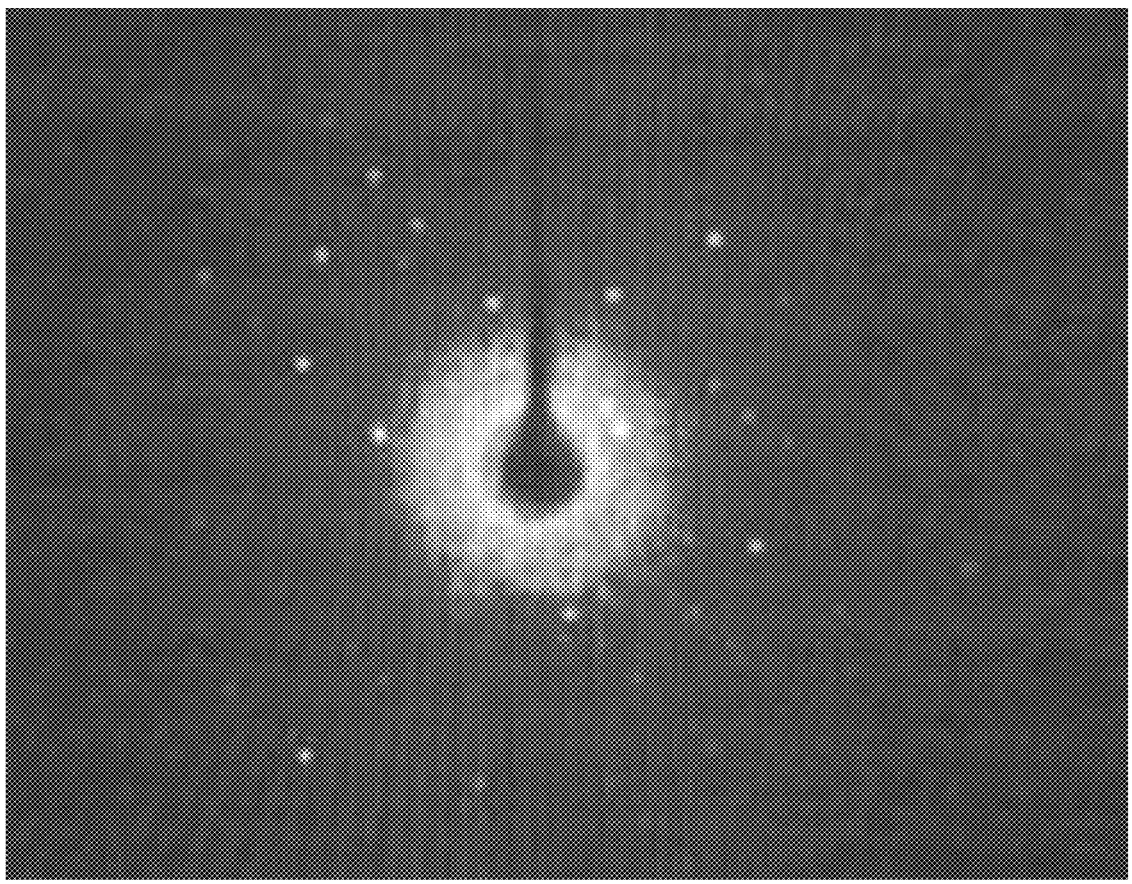
FIG. 3A is the X-ray scattering pattern of the resulting crystal.
Figure 3B:
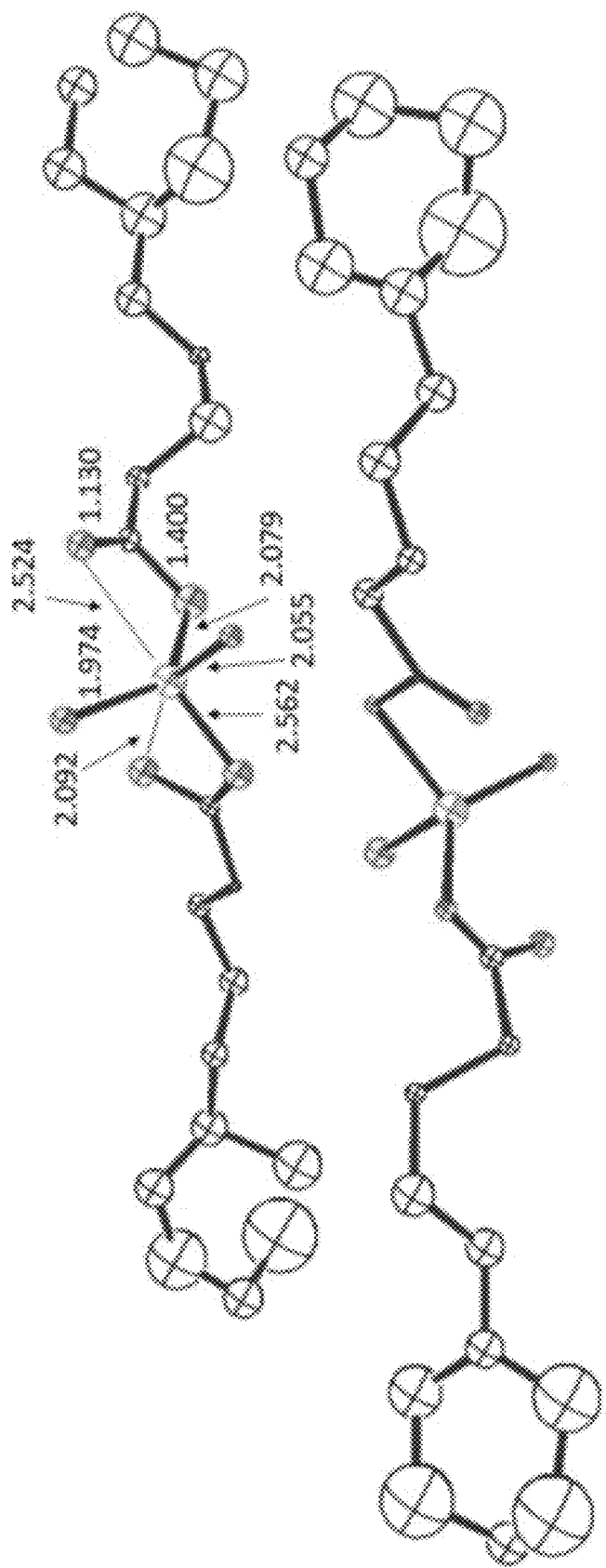
FIG. 3B is a structure of the resulting crystal (CCDC 1917011).

By extending the exposure time ($Zn^{2+}_{(aq)}$ towards decane/acid phase) to 30 min for the acid with n=4 and 0.5 M $Zn^{2+}$, the crystals form and grow to a thickness that is sufficient to enable isolation. The crystal was mounted in a diffractometer and was shown to scatter the incoming X-rays quite efficiently, indicating a distinct order of the formed crystal (CCDC 1917011). The maximum resolution was found to be 0.95 Å, yielding highly disordered cyclohexane rings, but being well-resolved around the most efficiently scattering $Zn^{2+}$ atoms. The scattering pattern is shown in FIG. 3A, and the solved structure of the formed crystal is shown in FIG. 3B. $Zn^{2+}$ ions are found to be hexa-coordinated with the acid oxygens, contributing differently to the binding environment in the sense that the C=O and C—O units are still structurally unique in the complex, which shows that the binding entity is COOH rather than $COO^-$. Hydrogen atoms could not be resolved due to the relatively low resolution of the crystal data. The $Zn^{2+}$ complex seems to further comprise two additional oxygen-based ligands which arise from the aqueous medium. $Zn^{2+}$ complexes are found in both tetra- and hexacoordination with neutral ligands favoring the hexacoordination in perfect agreement with the present results.

Structure Property Relationship

Figure 4B:
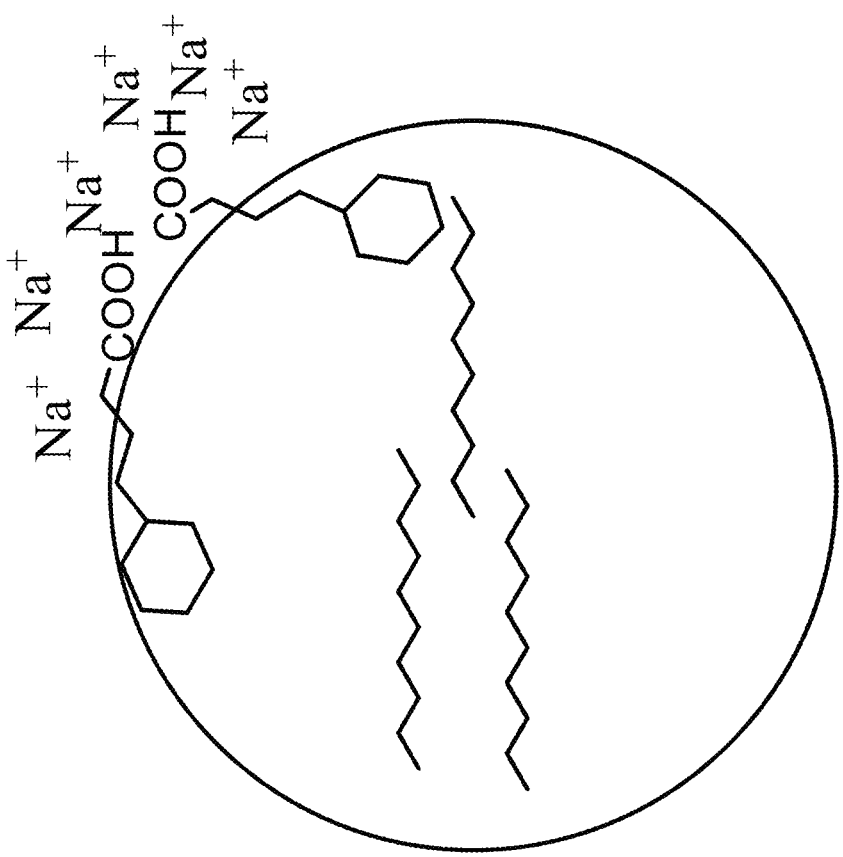
FIG. 4B is a schematic of the interplay between structure and electrolyte concentration with a large acid.
Figure 4A:
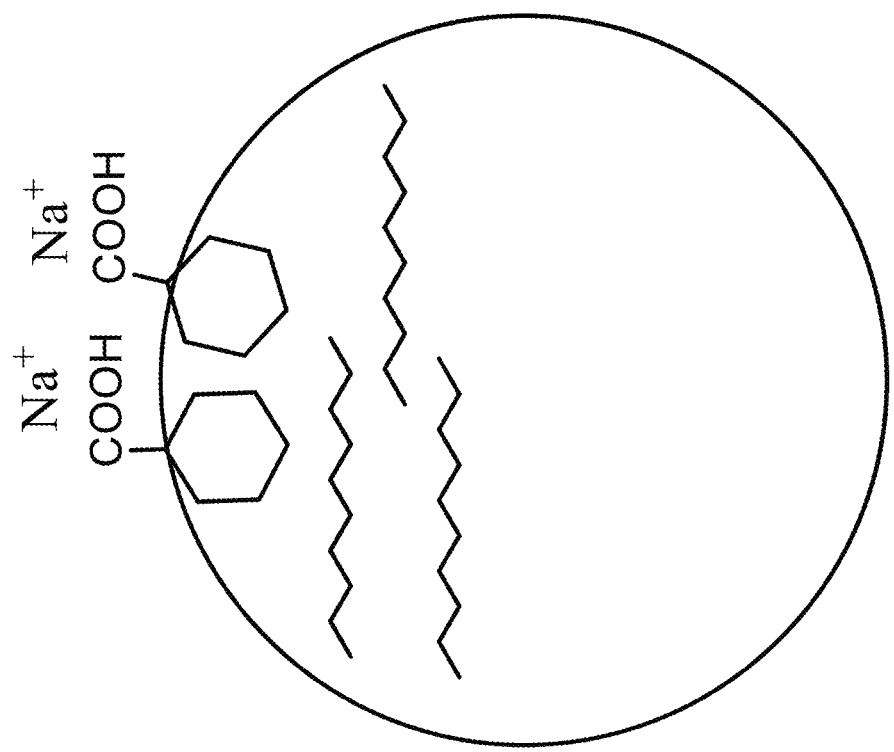
FIG. 4A is a schematic of the interplay between structure and electrolyte concentration with a small acid.

The structure shows that there is a requirement for a rather flat and flexible orientation of the organic acids at the interface to match the most favorable coordination angles for Zn. This is exactly what can be achieved in the case of the larger acids because of the larger fatty chains. These fatty chains allow for more favorable stacking and hydrophobic interaction with the decane phase while enabling a hydrophilic interaction via the COOH group to enable a favorable structure for the capture of the $Zn^{2+}$ ions. The flat structure for the larger acids is in line with the IFT findings. The n=1 acid has to orient itself to ensure that hydrophobic ring is fully submerged in the decane phase. This leaves little room for the electrolytes to stabilize the interface as the hydrophilic ends will be quite close, and more electrolytes will not stabilize the system but rather destabilize the system through coulombic repulsion. In the case of the longer chain acids, the position of the acid at the interface is as found in the crystal structure, which position is more forgiving, leaving room for more ions to interact at the interface. This idea is illustrated with the schematics of FIGS. 4A and 4B, of short and long chain acids, respectively, showing that structural parameters are important, such as packing at the surface. The surfactant has to be directed very specifically for the small acid compared to what is the case for the longer system. The longer system has some flexibility to the orientation of the surfactant at the interface. When the larger acid leaves more room for interaction with the electrolytes at the surface the IFT goes down as the concentration goes up.

A Theoretical Verification: Molecular Dynamics (MD)

Figure 5A:
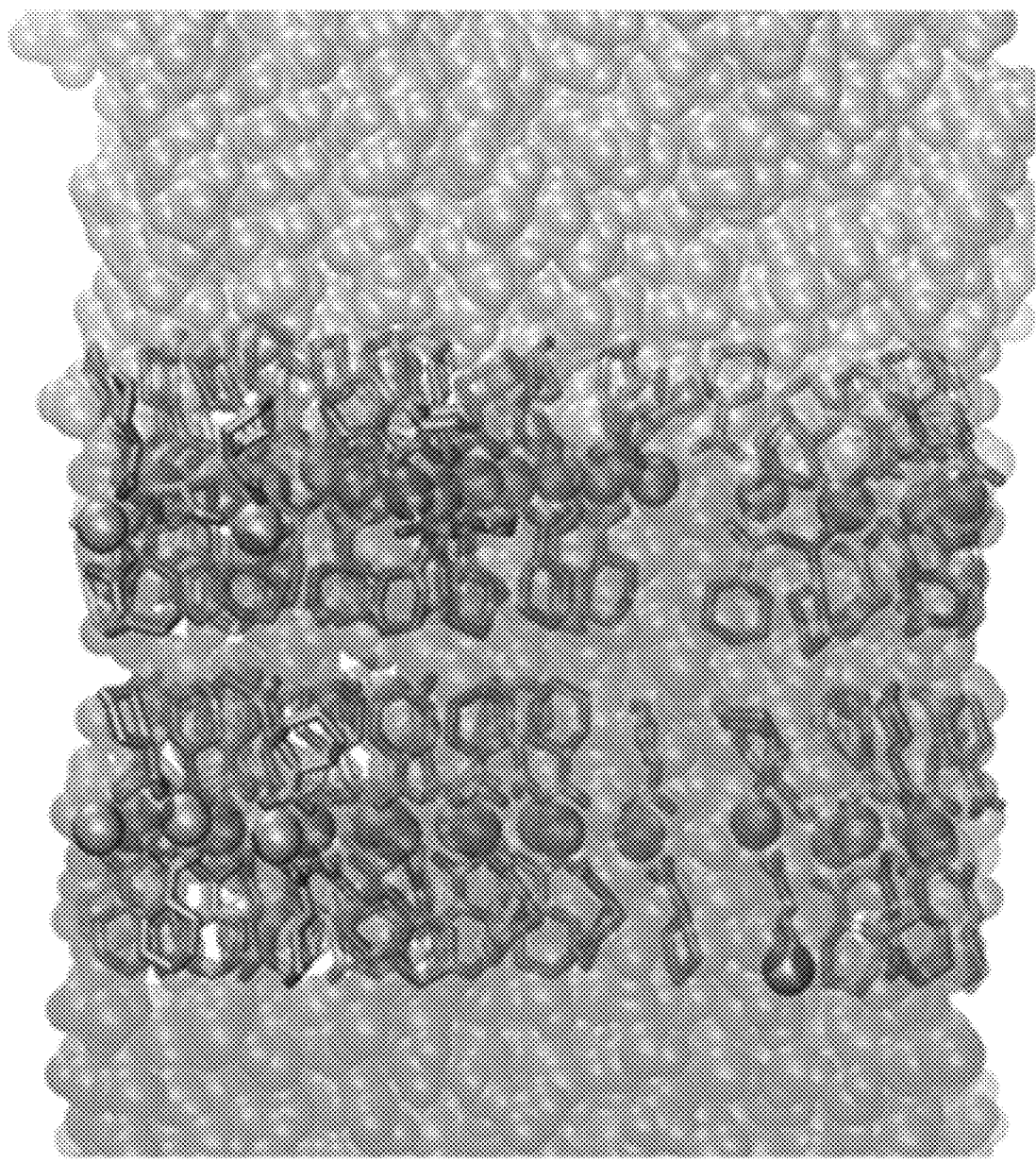
FIG. 5A is a molecular dynamics simulation of a Zn crystal with the n=0 acid at the decane water interface after 300 ns.
Figure 5B:
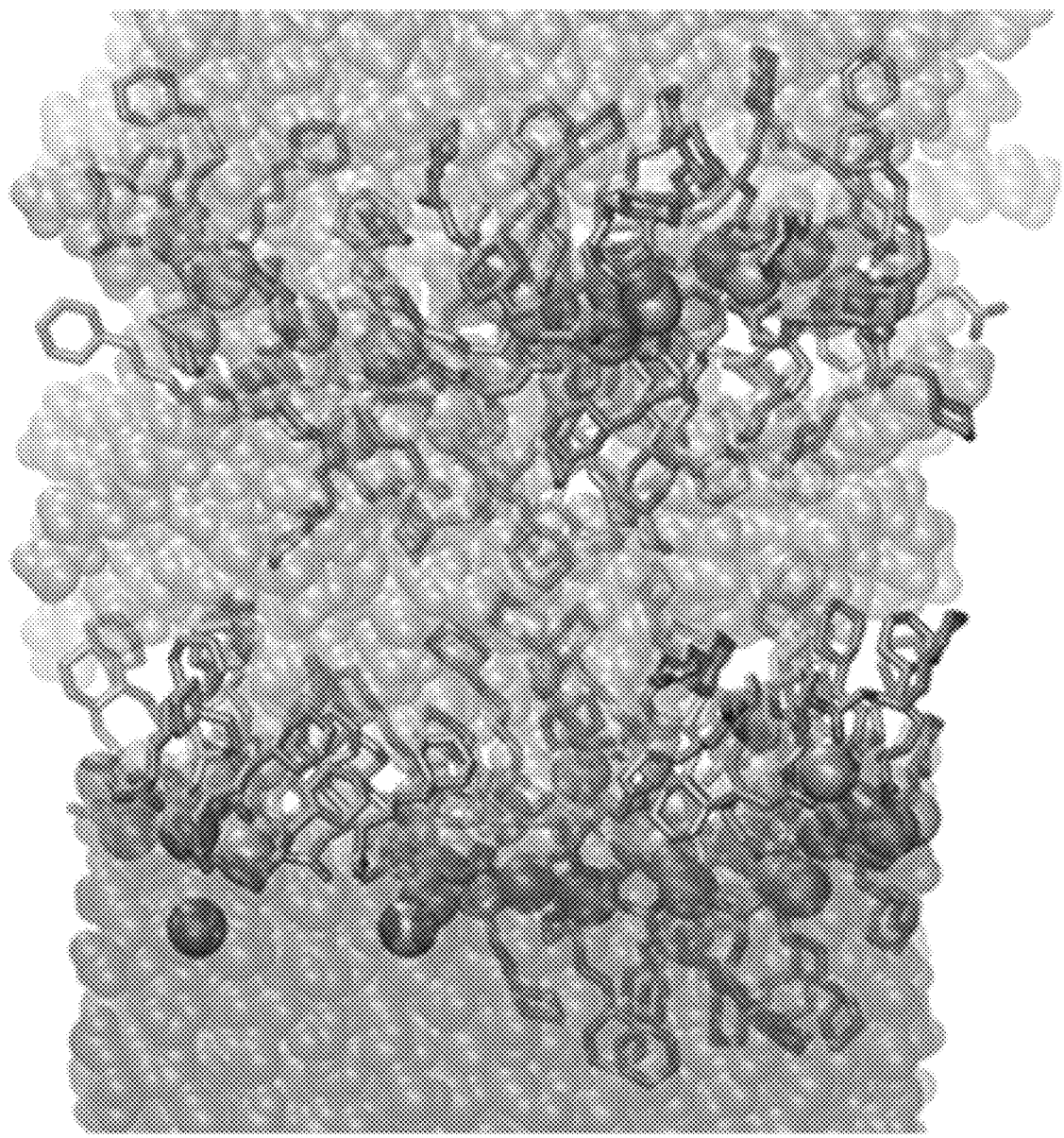
FIG. 5B is a molecular dynamics simulation of a Zn crystal with the n=4 acid at the decane water interface after 300 ns.

A molecular dynamics study has been found to be in agreement with all the experimental findings and has tied the final knot by providing an answer to why the crystal does not immediately dissolve in the surrounding water. FIGS. 5A and 5B show models of the crystal interface for n=0 and n=4, respectively, and give clear reasons for the lack of solubility of the Zn crystal once it is formed. The initial state was a uniformly distributed lattice in both cases, and water is at the bottom. It can be seen that water molecules simply cannot penetrate the crystal due to hydrophobic interactions in the case of n=4, whereas this is less of a problem in the case of n=0 where the penetration subsequently leads to dissolution.

The combined body of data with the first atomically resolved interface structure clearly shows that a wealth of parameters need to come together to enable the crystallization of an interface. However, by balancing the hydrophobic and hydrophilic interactions it is indeed possible to solidify interfaces with all the possible applications and side-effects it will have. In the present case the system was designed such that the IFT was impacted the most, only playing with a range of naturally occurring surfactants. In the context of increasing the performance of a subsurface reservoir, lowering the IFT of oil against brine will act favorably towards increased production. Controlled crystallization involving naturally-occurring surfactants (acids) will provide the means of making oil flow in a predetermined direction to avoid sections with large water content.

Liquid-liquid interfacial phenomena are central in a wide variety of scientific disciplines and encompass down-to-earth aspects such as mayonnaise production as well as more complex processes in cellular biology. Liquid-liquid interfacial phenomena also determine what drives the flow below the surface of the earth in, for example, an oil reservoir. It is the actual molecular structure at the boundary between two immiscible liquids that determines the interfacial properties. The experimental determination of such a structure has previously been unsuccessful. An experiment was shown above to enable crystallization of the interface between brine and a surfactant-containing organic phase. A single-crystal structure reveals, for the first time, how the structure and orientation of surfactants impact macroscopic measures such as interfacial tension.

The invention claimed is:

1. A method for determining a molecular structure of a surfactant complex formed at an immiscible liquid-liquid interface, the method comprising:
    forming the immiscible liquid-liquid interface between a single aqueous phase and a single non-aqueous phase, wherein the non-aqueous phase comprises an anionic surfactant, and wherein the non-aqueous phase is in the form of a droplet surrounded by the aqueous phase;
    adding to the aqueous phase a divalent metal salt, wherein the surfactant complex forms at the interface as a crystalline solid, the surfactant complex comprising the divalent metal salt and the anionic surfactant; and determining the molecular structure of the surfactant complex by X-ray crystallography of the crystalline solid.

2. The method of claim 1, wherein the divalent metal salt is present in the aqueous phase at a concentration in a range of 0.01-1.0 M.

3. The method of claim 1, wherein the divalent metal salt comprises at least one selected from the group consisting of $Zn^{2+}$, $Mg^{2+}$, $Ca^{2+}$, $Sr^{2+}$, $Ba^{2+}$, and $Fe^{2+}$.

4. The method of claim 3, wherein the divalent metal salt comprises $Zn^{2+}$.

5. The method of claim 4, wherein the divalent metal salt is at least one selected from the group consisting of $ZnCl_2$, $ZnBr_2$, $ZnI_2$, $ZnF_2$, $ZnCl_2$, $ZnO$, $ZnS$, $ZnSO_4$, $ZnSe$, $Zn(OH)_2$, $Zn(NO_3)_2$, and $Zn_3(PO_4)_2$.

6. The method of claim 5, wherein the divalent metal salt is $ZnCl_2$.

7. The method of claim 1, wherein the anionic surfactant is present in the non-aqueous phase at a concentration in a range of 0.5-3.0 mol % relative to a total number of moles of the non-aqueous phase.

8. The method of claim 1, wherein the anionic surfactant comprises an alkyl carboxylic acid group.

9. The method of claim 1, wherein the anionic surfactant is a cycloalkylalkyl carboxylic acid.

10. The method of claim 1, wherein the anionic surfactant is a cyclohexane alkyl carboxylic acid.

11. The method of claim 1, wherein the anionic surfactant is 3-cyclohexanepropionic acid, 4-cyclohexanebutanoic acid, 5-cyclohexanepentanoic acid, or 6-cyclohexanehexanoic acid.

12. The method of claim 1, wherein the aqueous phase is a brine.

13. The method of claim 1, wherein the molecular structure of the surfactant complex is determined by X-ray crystallography of the crystalline solid while the crystalline solid is located at the immiscible liquid-liquid interface.

14. The method of claim 1, wherein the non-aqueous phase is a hydrocarbon or a mixture of hydrocarbons.

15. The method of claim 14, wherein the hydrocarbon or mixture of hydrocarbons comprises one or more linear alkanes.

16. The method of claim 14, wherein the hydrocarbon or mixture of hydrocarbons comprises octane, nonane, decane, undecane, dodecane, tridecane, tetradecane, or pentadecane.

17. The method of claim 1, wherein the non-aqueous phase consists of the anionic surfactant and decane.

18. The method of claim 1, wherein the crystalline solid is allowed to form for at least 20 minutes.

19. The method of claim 1, wherein the molecular structure is determined with a maximum resolution of 1.00 Å or less.

20. The method of claim 1, wherein the molecular structure of the surfactant complex is determined with X-ray crystallography using a wavelength of about 0.1 nm and having a resolution of about 0.95 Å.

* * * * *